Patented June 26, 1951

2,557,948

UNITED STATES PATENT OFFICE 2,557,948

PROCESS FOR THE REGENERATION OF BONE CHAR

Victor R. Deitz, Washington, D. C., assignor to the United States of America as represented by the Secretary of Commerce No Drawing. Application December 13, 1949, Serial No. 132,789

3 Claims. (Cl. 252—414)

(Granted under the act of March 3, 1883, as amended April 30, 1928; 370 O. G. 757)

The invention described herein may be manufactured and used by or for the Government of the United States for governmental purposes without payment to me of any royalty thereon in accordance with the provisions of the act of April 30, 1928 (ch. 460, 45 Stat. 467).

This invention relates to processes for regenerating or revivifying solid adsorbents, such as those used in decolorizing procedures, and is particularly applicable to the regeneration of bone char during the refining of cane sugar. The properties of bone char have been utilized by the sugar refining industry for about 125 years in decolorizing commercial sugar products. During this time there has been steady progress towards simplification in the chemical and mechanical operations. The acid and alkali treatment, as well as the fermentation of the wet spent char, has been entirely eliminated and the regeneration now consists of a washing-drying-kilning cycle of operations. This invention is concerned with the regeneration process in its entirety as well as with the pertinent steps in the washing and in the kilning procedures.

The first feature of this new process for revivifying bone char is concerned with the washing operation. In present practice the filter, after operations with sugar liquors (known as the liquor cycle) is sweetened-off; i. e., the residual sugar solids are removed by displacement with hot water. After a specified time the effluent water is directed to the sewer and the filter washed with a large quantity of hot water. The function of this washing program is to remove the adsorbed mineral constituents which were added to the char during the filtration operations with the sugar liquors. The quantity of the hot water necessary for this operation is an important economic factor, the average charge of bone char, in commercial production, requiring 25,000 to 30,000 gallons of water maintained at a temperature of 190° to 210° Fahrenheit.

Despite this washing program, it is a fact that the bulk density of the revivified char gradually increases during the hundreds of cycles of operations. The original new bone char may have a bulk density in the neighborhood of 40 to 45 pounds per cubic foot. It is possible to separate a char fraction from the service char stock of a sugar refinery which has a bulk density of about twice this value; namely, 80 to 90 pounds per cubic foot. An obvious explanation is that the simple washing of the char does not remove all of the adsorbed mineral constituents which, in turn, were removed from the sugar liquors.

The present invention is designed to remove inorganic impurities picked up by the bone char during the aforementioned filtration cycle. These impurities are removed following the "sweetening-off" stage by the expedient of adding certain aqueous reagent solutions, preferably solutions of an ammonium salt of an organic acid, which react chemically so as to replace the mineral impurities held by the bone char. The added chemical is of such composition that it is later removed by volatilization during the subsequent heat treatment of the bone char as the latter passes through the revivification kiln. The original structure of the char is not modified.

Typical of reagent solutions which have been used successfully in this connection are ammonium acetate, ammonium citrate, and ammonium tartrate, in fairly concentrated solution. It is intended that the reagent solution be used over and over again until the power it originally possessed becomes expended. It is believed that an ion-exchange is accomplished between the inorganic impurities and the added reagent to account for this phenomenon, consisting in a reversal of the ion exchange reactions which took place in the sugar treatment by bone char. Accordingly, the solution should be sufficiently high in concentration of ammonium salt to effect this reversal. Since the pH of the reagent solution is not appreciably different from water itself, the existing construction materials of refinery equipment need not be altered.

In this process for regenerating bone char, a filter of bone char which has been sweetened-off is treated with a concentrated solution of the character mentioned. Ammonium acetate solution is a preferred medium. The volume of this solution need only be sufficient to fill partly the char filter, as for example, one-fourth of the fluid contents of the filter. The function of the ammonium acetate is to permit the exchange of adsorbed ions such as calcium, sulfate, and/or phosphate by the ammonium and acetate ions. The high concentration of the ammonium acetate solution controls the necessary ion exchange reactions. After filtration with the ammonium acetate, it is usual and desirable to displace the solution of ammonium acetate contained in the filter by the minimum quantity of water necessary.

An important feature of the above procedure is that the adsorbed ions have been substituted by particular ions which are removable by subsequent volatilization. This is preferably accomplished by a kilning procedure. The end result will be the avoidance of the accumulation of mineral ash constituents in the char. The result will be a regenerated char equal in porosity and bulk density to the original. Preferred kilning procedures will now be described.

Three different types of equipment have been used in commercial kilning operations with bone char. These are the conventional kiln with stationary retorts, the rotary drum for decarbonization, and the Herreshoff furnace. The chemical reactions which take place in the kiln are very complex, and it is convenient to divide them into two types. First, there are the destructive distillation reactions in which the adsorbed organic matter is decomposed in the absence of oxygen. This process will henceforth be termed "retorting." Second, partial combustion may take place between the carbonaceous matter with a limited supply of oxygen. This process will be called "roasting."

It has been shown that in commercial operations with the conventional kiln the char enters the retorts with about 10 percent moisture and, following the expulsion of this moisture, there is a destructive distillation of the adsorbed impurities. Following this retorting action the char may be exposed to limited quantities of air, either unintentionally through leaks, or deliberately at the top of the cooler pipes. As a result the complete kilning operation may be viewed as a retorting followed by a roasting.

It is possible to combine the roasting and retorting action in two ways. From this point of view the possibilities in kiln operation may be divided into four classes:

Process I—Roasting only.
Process II—Retorting followed by roasting.
Process III—Retorting only.
Process IV—Roasting followed by retorting.

Conventional kiln operations are thus seen to be classified as examples of Process II. From a similar point of view operations with a rotary drum for decarbonization of bone char may be considered as examples of Process I. The published operations with the Herreshoff furnace may be considered as a close approach to Process IV.

In order to explore the relative influence on the final decolorizing properties of a char revivified with each of the four kilning processes, 12 cycles of complete operations were made. The original material was a water-washed new bone char (10 x 28) which was divided into four equal quantities by passage through a riffler. Each of the four samples was treated with a mixture of unwashed 65 Brix Cuban raw sugar with 5 percent by weight of a blackstrap molasses. The sugar mixture was preliminarily limed to pH 7.5, filter added, and a filtration made through a cloth filter. The operations known in the trade as "settling," "sweetening-off," and "washing-to-sewer" were identical for each filtration operation. Altogether a total of forty-eight cycles of operation were conducted.

The retorting operations were made in stainless steel rectangular retorts 1 x 7 x 17 inches. A stream of nitrogen was passed continuously across the top of a T-connection to the ¾ inch retort opening in order to assure the exclusion of oxygen and an efficient disposal of the foul-smelling volatile products. The retort was placed in a muffle furnace which was controlled automatically to give a temperature of 500° centigrade (930° F.) to 550° centigrade (1020° F.) in the center of the char.

The roasting operations were made in the shallow rectangular trays constructed of stainless-steel centrifugal-basket screening. They were 1 x 7 x 17 inches in height, width, and length, respectively. The depth of the char never exceeded 0.5 inch. The temperature and time were adjusted so as to maintain the original percent carbonaceous matter of the starting char. Consequently, the roasting temperatures were specified values in the range 175°–200° centigrade (350°–390° F.).

It was possible to maintain accurate control of the percentage of carbonaceous matter in the regenerated char by either Processes I, II, or IV. Only in Process III where air is rigorously excluded did the percent carbonaceous matter steadily increase with the number of cycles of operation. The low temperatures required for roasting (350°–390° F.) are a result of the action of the high concentration of atmospheric oxygen. It has been well established from independent experiments that the dried freshly-adsorbed organic matter is more reactive with oxygen than the carbonaceous residue of the original char.

The pH of the water extract of revivified chars is a significant quantity which is used in control operations. The pH of the char from Process I averaged 6.0; that of Process II, 6.5; Process III, 8.5; and Process IV, 8.5. From this point of view Process III or Process IV is the most desirable.

The carbonate content of revivified char is another significant variable. The percent of carbonate as $CO_2$ averaged 2.5 for Process I; 3.0 for Process II; 3.0 for Process III; and 3.3 for Process IV. From this point of view Process IV seems to be most desirable.

The color removal of the revivified char is, of course, the most important factor. This was determined in two ways. First, the total color of the filtered liquor was obtained for each of the twelve filtrations of each of the twelve cycles and this quantity was subtracted from the total color of the liquor entering each particular column. It was thus possible to estimate the overall percent decolorization realized with each column. The second way of ascertaining the percent decolorization was to determine the percent color removal in a batch test with a sample of the revivified char from each cycle for each process.

The results of all color removal tests indicated that Process I resulted in the least decolorization. The average of the last 9 cycles of operation for Processes II, III, and IV were respectively 52%, 51%, and 51%. There was, however, one important distinguishing feature in the filtrates from these processes. Only Processes II and IV delivered filtrates which were free of the characteristic odor known in the trade as "bone odor." The average percent ash removals were approximately equal for all four processes. The results for the percent color removal in a batch test with the chars revivified in the 12 cycles of operation for each process show similar trends:

Process I—67% (av.)
Process II—74% (av.)
Process III—75% (av.)
Process IV—77% (av.)

Process IV is apparently the most satisfactory of the four procedures just outlined. Commercial operations in revivifying bone char have never considered a roasting at low temperature followed by a retorting at a higher temperature. The two variables which must be controlled in the roasting process are the temperature and the oxygen concentration. Although this invention is not confined to particular values for oxygen concentration and temperature, it has been found most convenient to use atmospheric oxygen concentration and control conditions so that this is maintained during the entire roasting. The temperature is then controlled so as to maintain the desired limited combustion of the spent char. As previously noted, these temperatures are in the range from 350° to 440° Fahrenheit.

Process IV may be conducted in the existing equipment of the conventional kiln with relatively few modifications. In the new type of DeVries drier (patent pending) it is possible to divide the drier into two sections and in one section permit the drying of the char to take place. The remaining section can be used to conduct the roasting operation. It may be pointed out that in the new DeVries drier a vertical column of char is confined to flow downwards between two screens. Heated air at a controlled rate of flow and temperature is passed through the char.

The preferred process for revivifying bone char in its entirety therefore includes the following: (1) the acetate treatment of the char filter which immediately follows the "sweetening-off" step; (2) displacement of the concentrated ammonia acetate solution by the minimum quantity of water; (3) a low temperature roasting of the char which immediately follows the drying step; (4) a retorting of the roasted char at a temperature in the neighborhood of that now employed, viz. 800° to 1000° Fahrenheit; (5) the char is then cooled to 180° Fahrenheit in absence of air and transported back to the filter.

The chemical removal of inorganic impurities picked up by bone char will have the following advantages:

(1) It will greatly reduce the vast quantities of water which are used in present practice to remove the aforementioned inorganic impurities. In this connection, it is of interest to note that whereas, under present practice, the decolorizing process involves the use of 25,000 to 30,000 gallons of hot water, this quantity, under the invention herein disclosed, is reduced to an average of 6000 to 8000 gallons. Moreover, chemicals such as ammonium acetate are low enough in cost and used in sufficiently small amounts as to represent definite savings in refining costs. For example, a typical commercial charge of the bone char (46 tons) may be treated with 50 to 100 pounds of ammonium acetate.

(2) By maintaining the residual inorganic impurities at a minimum it will greatly enhance the life of the bone char.

(3) When combined with Process IV in kiln operation it will maintain the decolorization properties of bone char at optimum value.

The application of the procedures herein disclosed to the general field of activated carbons used in decolorizing is inherent in the present invention and comprised within its scope.

What is claimed is:

1. The process of regenerating bone char in cane sugar refining, which comprises treating the char with a solution of an ammonium salt of an organic acid to replace inorganic ions adsorbed during the liquor cycle with volatile ions, roasting the char at a temperature in the range of 350° to 440° Fahrenheit, and thereafter retorting the char at a temperature in the range of approximately 930° to 1020° Fahrenheit.

2. The process of regenerating bone char in cane sugar refining, which comprises treating the char with a solution of an ammonium salt of an organic acid to replace inorganic ions adsorbed during the liquor cycle with volatile ions, roasting the char at a temperature in the range of 350° to 440° Fahrenheit, while maintaining atmospheric oxygen concentration, and thereafter retorting the char at a temperature in the range of approximately 930° to 1020° Fahrenheit.

3. The process of regenerating bone char in cane sugar refining, which comprises treating the char with a solution of an ammonium salt of an inorganic acid, displacing the ammonium acetate solution by water, roasting the char at a temperature of approximately 350° to 450° F., retorting the roasted char at a temperature of approximately 800° to 1000° F., and cooling the char to approximately 180° F. in the absence of air.

VICTOR R. DEITZ.

REFERENCES CITED

The following references are of record in the file of this patent:

UNITED STATES PATENTS

| Number | Name | Date |
| --- | --- | --- |
| 1,533,031 | Sauer | Apr. 7, 1925 |
| 1,843,616 | Mackert | Feb. 2, 1932 |

FOREIGN PATENTS

| Number | Country | Date |
| --- | --- | --- |
| 2571 | Great Britain | 1866 |